US010353216B2

(12) United States Patent
Minamisawa et al.

(10) Patent No.: US 10,353,216 B2
(45) Date of Patent: Jul. 16, 2019

(54) OPTICAL UNIT WITH SHAKE CORRECTION FUNCTION AND ITS MANUFACTURING METHOD

(71) Applicant: NIDEC SANKYO CORPORATION, Suwa-gun, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 392 days.

(21) Appl. No.: 15/207,813

(22) Filed: Jul. 12, 2016

(65) Prior Publication Data
US 2017/0017093 A1    Jan. 19, 2017

(30) Foreign Application Priority Data

Jul. 14, 2015 (JP) ................................ 2015-140108
Jun. 2, 2016 (JP) ................................ 2016-111149

(51) Int. Cl.
| H04N 5/225 | (2006.01) |
| H04N 5/232 | (2006.01) |
| G02B 27/64 | (2006.01) |
| G03B 5/06  | (2006.01) |
| G02B 7/08  | (2006.01) |

(52) U.S. Cl.
CPC ............ *G02B 27/646* (2013.01); *G02B 7/08* (2013.01); *G03B 5/06* (2013.01); *G03B 2205/0023* (2013.01); *G03B 2205/0069* (2013.01)

(58) Field of Classification Search
CPC ......... H04N 5/23248–5/23287; H04N 5/2254
USPC ............................................ 348/208.4, 208.7
See application file for complete search history.

(56) References Cited

U.S. PATENT DOCUMENTS

| 2009/0321595 | A1* | 12/2009 | Conway | ............... G09F 3/204 |
| | | | | 248/205.3 |
| 2015/0207995 | A1* | 7/2015 | Takagi | ............... H04N 5/23254 |
| | | | | 348/169 |
| 2017/0045753 | A1* | 2/2017 | Enta | ........................ G02B 7/04 |
| 2017/0353662 | A1* | 12/2017 | Enta | ........................ G03B 5/00 |

FOREIGN PATENT DOCUMENTS

JP          2014006522 A    1/2014

* cited by examiner

*Primary Examiner* — Anthony J Daniels
(74) *Attorney, Agent, or Firm* — Cantor Colburn LLP

(57) ABSTRACT

An optical unit with a shake correction function may include a movable body having an optical element, a fixed body swingably supporting the movable body through a gimbal mechanism, and a drive mechanism to drive the movable body around the first axial line and the second axial line. The gimbal mechanism includes a movable frame, two first swing support points provided between the movable frame and the fixed body and two second swing support points provided between the movable frame and the movable body. At least one of the two swing support points includes a contact spring having a movable plate part with which the movable frame is abutted, and a fixed plate part which is bent back from the movable plate part, and a fixing member which fixes the movable plate part to the fixed plate part.

22 Claims, 9 Drawing Sheets

Fig. 1A
Fig. 1B
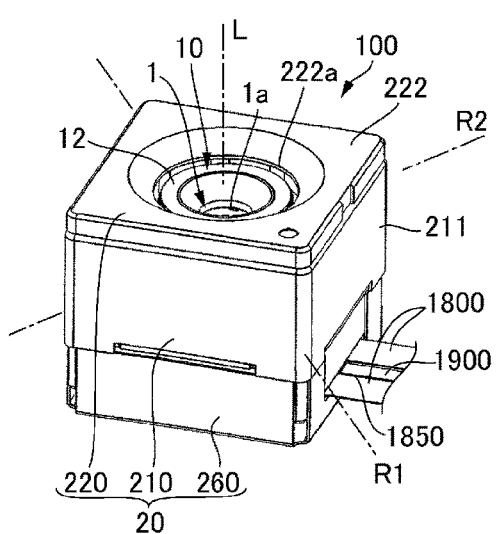
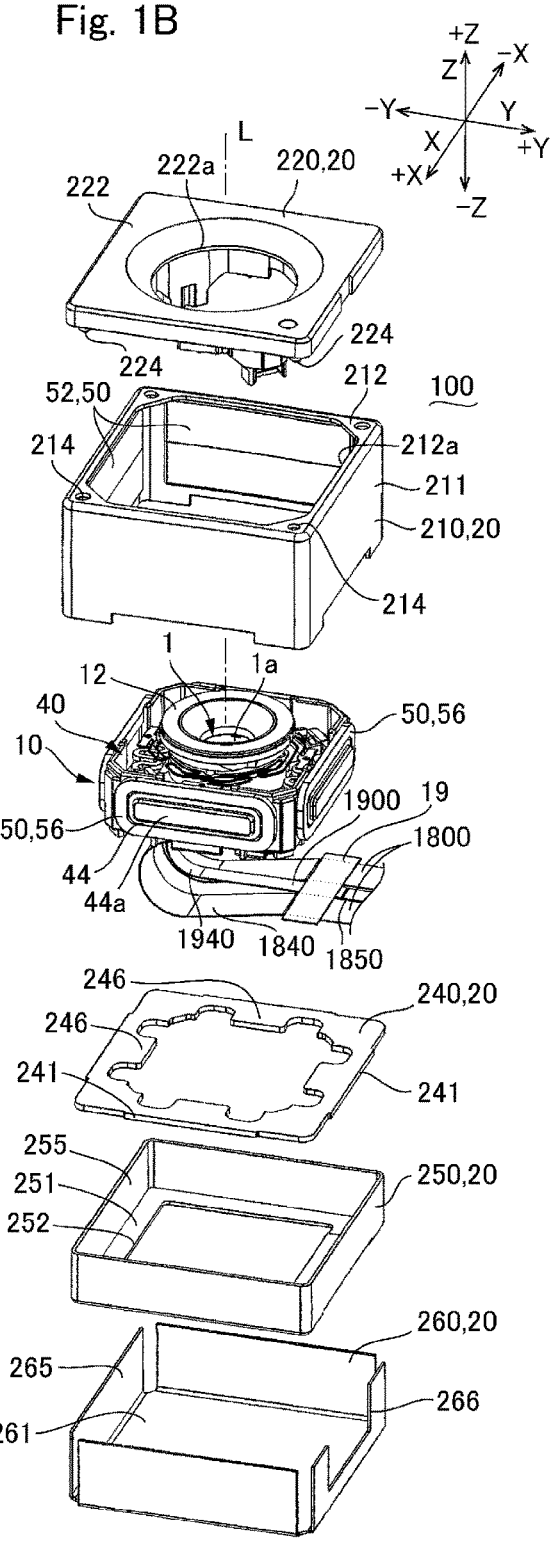

Fig. 3A
Fig. 3B
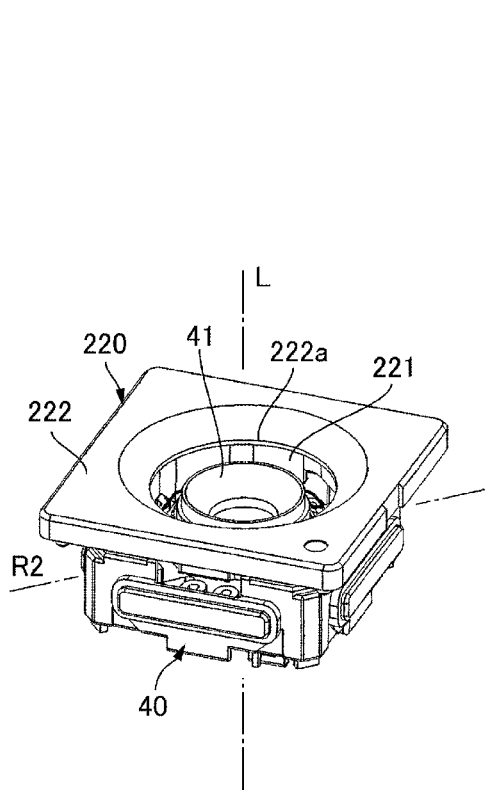
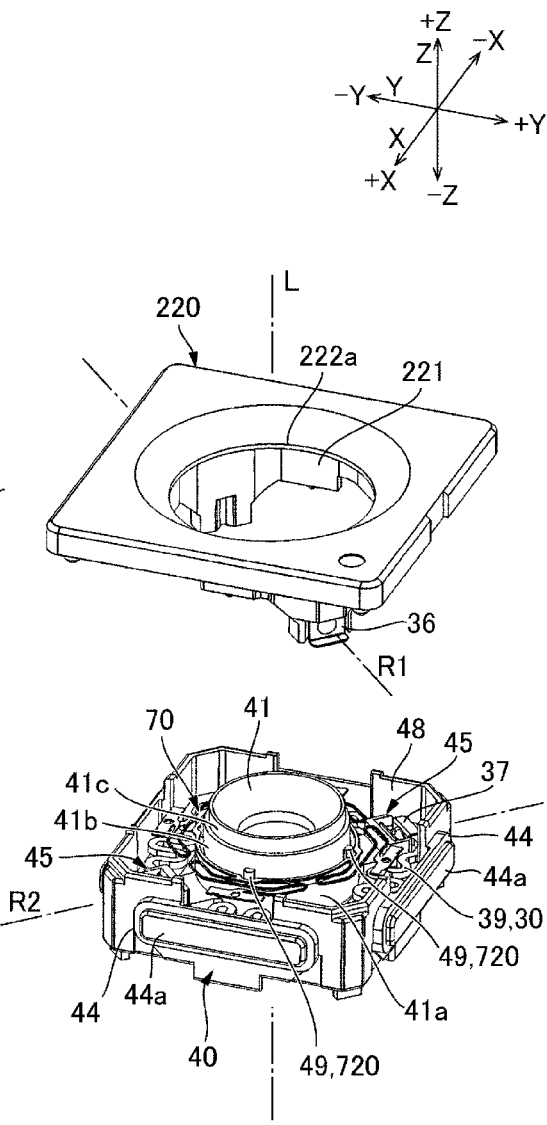

Fig. 6A
Fig. 6B
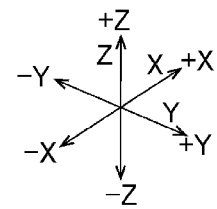
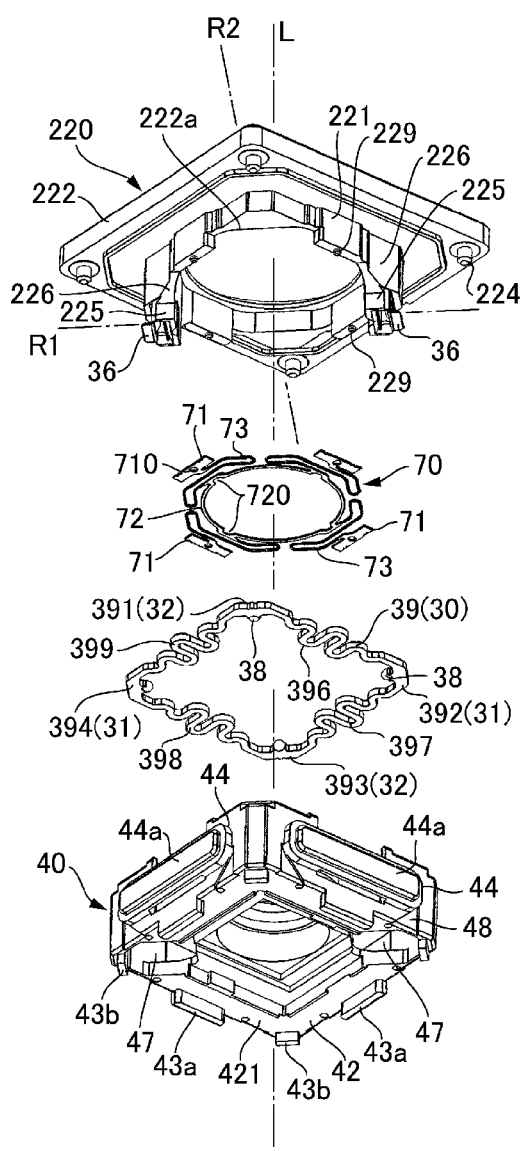
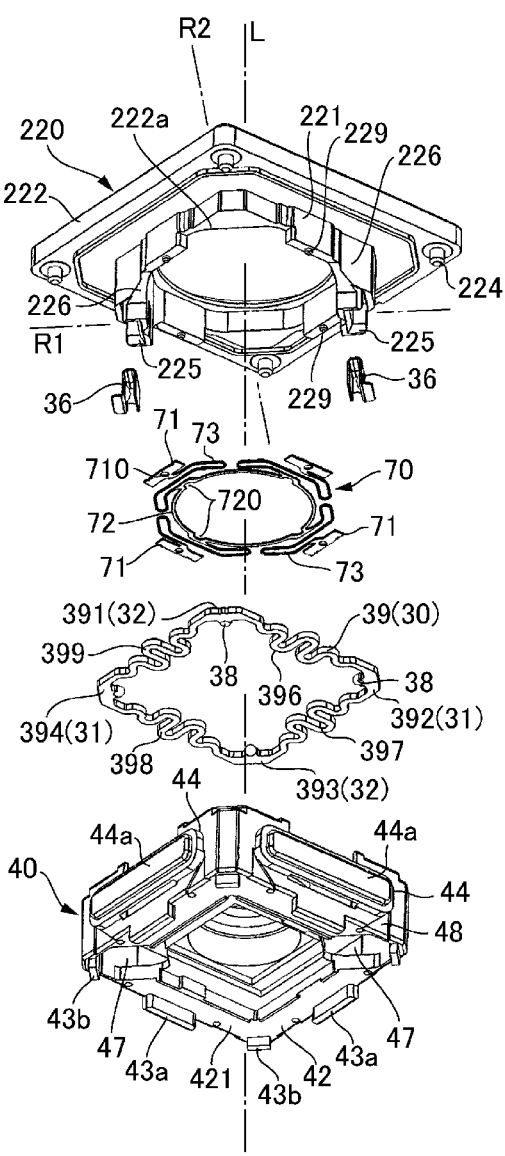

Fig. 8A
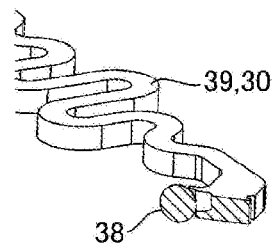
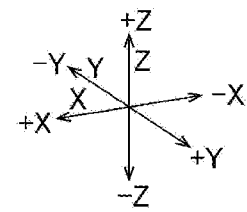
Fig. 8B
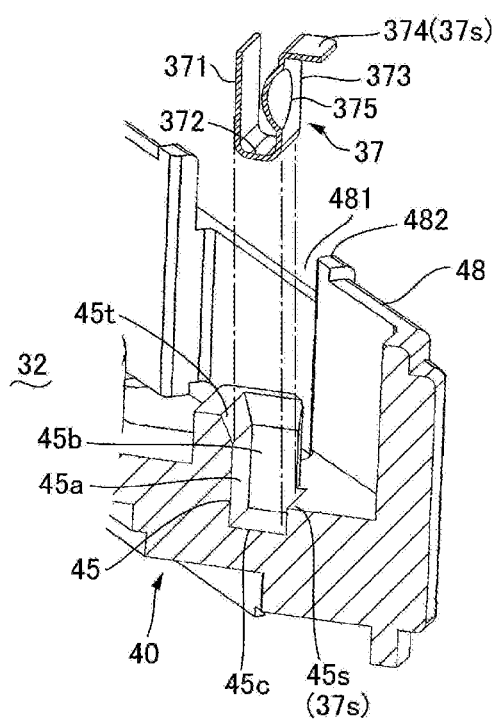
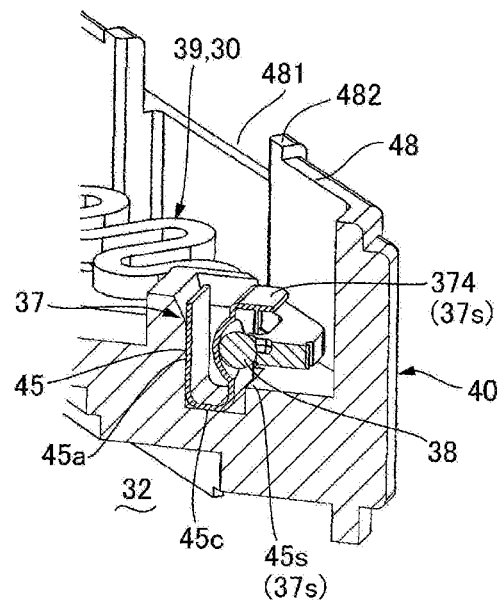
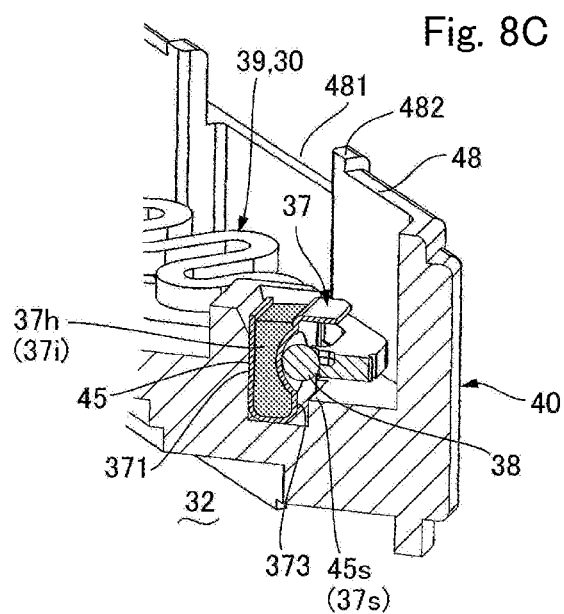
Fig. 8C

OPTICAL UNIT WITH SHAKE CORRECTION FUNCTION AND ITS MANUFACTURING METHOD

CROSS REFERENCE TO RELATED APPLICATION

The present invention claims priority under 35 U.S.C. § 119 to Japanese Application No. 2015-140108 filed Jul. 14, 2015, and Japanese Application No. 2016-111149, filed Jun. 2, 2016, the entire contents of which are incorporated herein by reference.

FIELD OF THE INVENTION

At least an embodiment of the present invention may relate to an optical unit with a shake correction function which is capable of correcting a shake at the time of photographing and may relate to its manufacturing method.

BACKGROUND

In order to restrain disturbance of a photographed image due to a shake in a camera which is mounted on a portable apparatus or the like, a structure has been proposed in which a movable body is structured to swing for correcting the shake. For correcting the shake, the movable body is required to be swingably supported by a fixed body and thus, a structure has been proposed in which a gimbal mechanism is provided between the movable body and the fixed body. A structure has been proposed as the gimbal mechanism which includes a movable frame provided between a movable body and a fixed body, first swing support points provided between the movable frame and the fixed body at two positions separated in a first axial line direction intersecting an optical axis direction, and second swing support points provided between the movable frame and the movable body at two positions separated in a second axial line direction intersecting the optical axis direction and the first axial line direction (see Japanese Patent Laid-Open No. 2014-6522).

In a case that the movable body is supported by the gimbal mechanism, when an appropriate load is applied to the movable frame by springs (contact springs) provided at the swing support points, the movable body is capable of being swung smoothly and is also capable of restraining an unnecessary shake of the movable body due to a shake transmitted from the outside.

However, in a case that the movable frame is supported by the contact spring so as to apply a load to the movable frame, if a falling load is applied to the optical unit to occur that the contact spring is deformed, impact resistance may be lowered and, for example, the contact spring may be unable to appropriately support the movable body. Further, when the contact spring is deformed to occur that the load applied to the movable frame by the contact spring is reduced, the position of the movable frame may be displaced by a shake applied from the outside and, in an extreme case, the movable frame is disengaged from the contact spring so that the movable body is not supported by the contact spring.

SUMMARY

In view of the problem described above, at least an embodiment of the present invention may advantageously provide an optical unit with a shake correction function which is capable of applying an appropriate load to the movable frame and restraining lowering of impact resistance, and may advantageously provide its manufacturing method.

According to at least an embodiment of the present invention, there may be provided an optical unit with a shake correction function including a movable body comprising an optical element, a fixed body which swingably supports the movable body around a first axial line intersecting an optical axis direction and swingably supports the movable body around a second axial line intersecting the optical axis direction and the first axial line through a gimbal mechanism, and a drive mechanism structured to drive the movable body around the first axial line and the second axial line. The gimbal mechanism includes a movable frame, first swing support points which are provided between the movable frame and the fixed body at two positions separated from each other in the first axial line direction, and second swing support points which are provided between the movable frame and the movable body at two positions separated from each other in the second axial line direction. At least one swing support point of the two first swing support points and the two second swing support points includes a contact spring in a plate spring shape having a movable plate part with which the movable frame is abutted and a fixed plate part which is bent back from an end part of the movable plate part to an opposite side to the movable frame, and a fixing member which fixes the movable plate part to the fixed plate part.

Further, according to at least an embodiment of the present invention, there may be provided a manufacturing method for an optical unit with a shake correction function, the optical unit including a movable body having an optical element, a fixed body which swingably supports the movable body around a first axial line intersecting an optical axis direction and swingably supports the movable body around a second axial line intersecting the optical axis direction and the first axial line through a gimbal mechanism, and a drive mechanism structured to drive the movable body around the first axial line and the second axial line. The gimbal mechanism includes a movable frame, first swing support points which are provided between the movable frame and the fixed body at two positions separated from each other in the first axial line direction, and second swing support points which are provided between the movable frame and the movable body at two positions separated from each other in the second axial line direction. The manufacturing method includes previously providing a contact spring in a plate spring shape in at least one swing support point of the two first swing support points and the two second swing support points, the contact spring including a movable plate part with which the movable frame is abutted and a fixed plate part which is bent back from an end part of the movable plate part to an opposite side to the movable frame. When the gimbal mechanism is to be structured, after the movable frame is supported by the contact spring, the movable plate part and the fixed plate part are fixed to each other by a fixing member.

In at least an embodiment of the present invention, the swing support point includes a contact spring in a plate spring shape having a movable plate part with which the movable frame is abutted and a fixed plate part which is bent back from an end part of the movable plate part to an opposite side to the movable frame. Therefore, in a state that the gimbal mechanism has been structured, the movable frame receives an appropriate load from the contact spring. Accordingly, the movable body can be swung smoothly and an unnecessary shake of the movable body due to a shake or the like transmitted from the outside can be restrained. In this state, the movable plate part is fixed to the fixed plate part by a fixing member. Therefore, even when a falling load or the like is applied, the contact spring is hard to be deformed and thus the movable frame is supported by the contact spring in a state that an appropriate load is applied from the contact spring. Accordingly, even when the movable frame is supported by the contact spring, lowering of impact resistance can be restrained. Further, lowering of a load applied to the movable frame by the contact spring due to deformation of the contact spring is hard to be occurred and thus positional displacement of the movable frame due to a shake applied from the outside is hard to be occurred. Therefore, a situation is hard to be occurred that the movable frame is disengaged from the contact spring and the movable frame is not supported by the contact spring.

In an optical unit with a shake correction function in accordance with at least an embodiment of the present invention, the movable plate part is fixed to the fixed plate part by the fixing member in a state that the movable plate part has been elastically deformed toward the fixed plate part. In other words, in the manufacturing method for an optical unit with a shake correction function in accordance with at least an embodiment of the present invention, the movable plate part is elastically deformed toward the fixed plate part in a state that the gimbal mechanism has been structured and, in this state, the movable plate part is fixed to the fixed plate part by the fixing member. According to this structure, in a state that the gimbal mechanism has been structured, the contact spring can be restrained from being deformed in a state that an appropriate load is surely applied to the movable frame by the contact spring.

In at least an embodiment of the present invention, the movable frame is capable of being elastically deformed in a direction perpendicular to the optical axis direction. According to this structure, even after a fixing member is provided in the contact spring, a load can be surely applied to the movable frame by spring force of the movable frame itself.

In at least an embodiment of the present invention, the optical unit includes a first contact spring as the contact spring whose fixed plate part is held by the fixed body in each of the two first swing support points, and a second contact spring as the contact spring whose fixed plate part is held by the movable body in each of the two second swing support points, and the fixing member is provided in each of the two first contact springs and each of the two second contact springs. According to this structure, the first contact spring and the second contact spring can be restrained from being deformed in a state that an appropriate load is applied to the movable frame in each of the first swing support point and the second swing support point.

In at least an embodiment of the present invention, the first contact spring and the fixed body are overlapped with the movable frame on both sides in the optical axis direction to structure a first stopper for restricting a movable range in the optical axis direction of an abutting portion of the movable frame with the first contact spring, and the second contact spring and the movable body are overlapped with the movable frame on both sides in the optical axis direction to structure a second stopper for restricting a movable range in the optical axis direction of an abutting portion of the movable frame with the second contact spring. According to this structure, even when a shake for moving the movable frame in the optical axis direction is applied to the movable frame from the outside, the movable frame is hard to be disengaged from the contact spring.

In at least an embodiment of the present invention, the optical unit includes at least one of penetration parts of the movable body which are overlapped with the two first swing support points in the optical axis direction and penetration parts of the fixed body which are overlapped with the two second swing support points in the optical axis direction. According to this structure, after a fixing member is provided in the second contact spring provided in the second swing support point, a fixing member can be provided in the first contact spring provided in the first swing support point through the penetration part. Alternatively, after a fixing member is provided in the first contact spring provided in the first swing support point, a fixing member can be provided in the second contact spring provided in the second swing support point through the penetration part.

In at least an embodiment of the present invention, the fixing member is an adhesive which is applied between the fixed plate part and the movable plate part. According to this structure, after an adhesive is applied between the fixed plate part and the movable plate part, it is sufficient that the adhesive is solidified and thus the fixing member can be provided easily. Further, the adhesive is in a liquid state before solidified and thus, the adhesive can be applied between the fixed plate part and the movable plate part regardless of the shape of the contact spring and thus the fixed plate part and the movable plate part can be fixed surely.

In at least an embodiment of the present invention, the fixing member is a plate-shaped member which is connected with the fixed plate part and the movable plate part on an open end side of the contact spring. In this case, when the plate-shaped member is provided in the contact spring itself, the plate-shaped member as a fixing member is not required to be separately provided.

In at least an embodiment of the present invention, an abutting portion of the movable frame with the contact spring is formed of a spherical body and a portion of the contact spring where the spherical body is abutted is formed in a concave curved-surface shape.

In at least an embodiment of the present invention, the drive mechanism is a magnetic drive mechanism, and the movable frame and the contact spring are made of nonmagnetic material. According to this structure, the drive mechanism (magnetic drive mechanism) is prevented from being magnetically affected by the movable frame and the contact spring.

In at least an embodiment of the present invention, the fixed body includes a cover to one side in the optical axis direction of the movable body, and the first swing support point is structured between the cover and the movable frame. According to this structure, the number of members structuring the gimbal mechanism can be reduced.

In at least an embodiment of the present invention, the movable frame is provided with four corner parts, the first swing support point is structured in two corner parts located at diagonal positions of the four corner parts, and the second swing support point is structured in the other two corner parts.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A and 1B are explanatory views showing an entire structure of an optical unit with a shake correction function in accordance with an embodiment of the present invention.

FIGS. 3A and 3B are explanatory views showing a holder and a cover of an optical unit in accordance with an embodiment of the present invention which is viewed from an object side.

FIGS. 6A and 6B are explanatory views showing a gimbal mechanism of an optical unit in accordance with an embodiment of the present invention which is viewed from an opposite side to an object side.

FIGS. 8A, 8B and 8C are explanatory views showing a second swing support point of an optical unit in accordance with an embodiment of the present invention which is viewed from an object side.

DETAILED DESCRIPTION

An embodiment of the present invention will be described below with reference to the accompanying drawings. In the following description, a structure for preventing a shake of a movable body for photographing (optical module) will be described as an example. Further, in the following description, three directions perpendicular to each other are referred to as an "X"-axis direction, a "Y"-axis direction and a "Z"-axis direction, and a direction along an optical axis "L" (optical axis of a lens/optical axis of an optical element) is set to be the "Z"-axis direction. "+X" is indicated on one side in the "X"-axis direction, "−X" is indicated on the other side, "+Y" is indicated on one side of the "Y"-axis direction, "−Y" is indicated on the other side, "+Z" is indicated on one side (object side/front side in the optical axis direction) in the "Z"-axis direction, and "−Z" is indicated on the other side (opposite side to an object side/rear side in an optical axis direction).

(Entire Structure of Optical Unit for Photographing)

Figure 2:
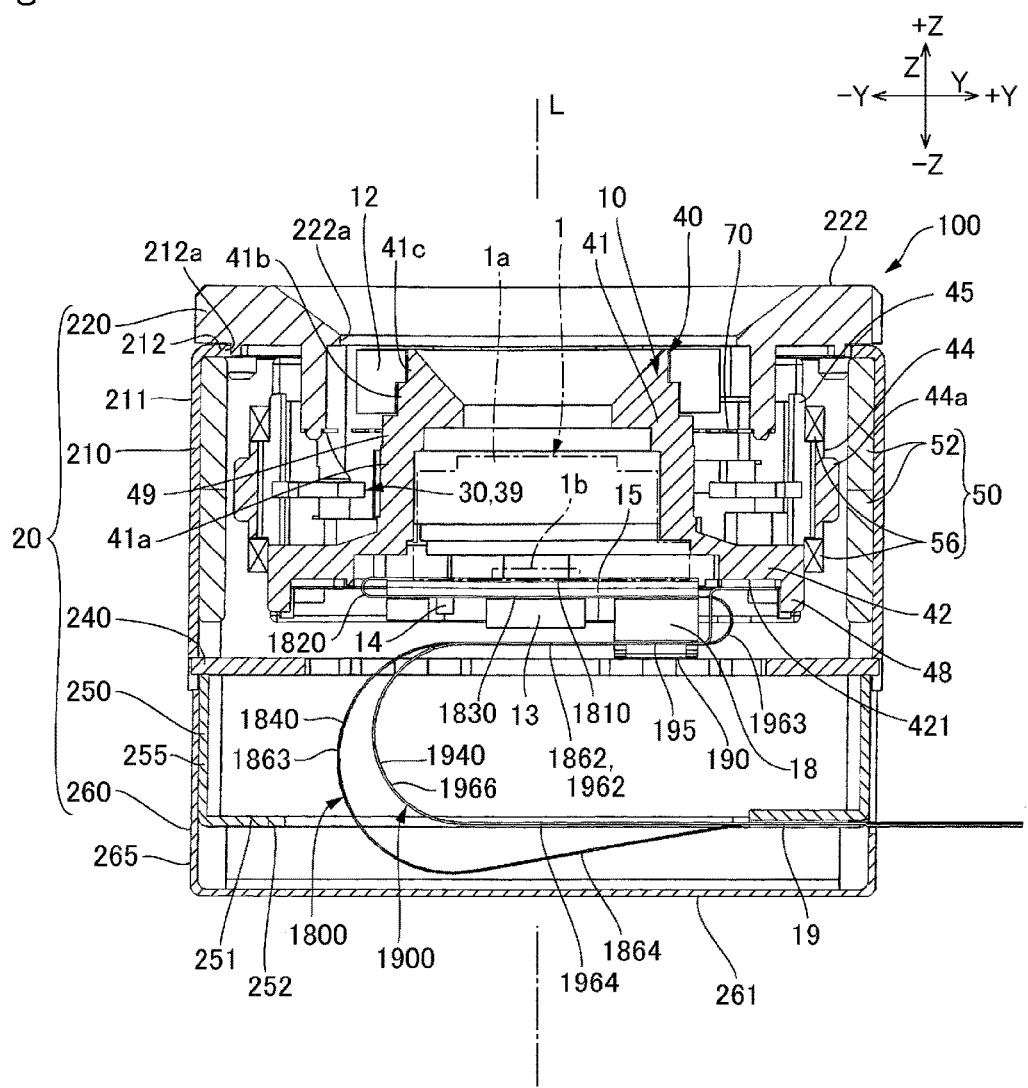
FIG. 2 is a "YZ" cross-sectional view showing the optical unit in FIG. 1A.

FIGS. 1A and 1B are explanatory views showing an entire structure of an optical unit 100 with a shake correction function in accordance with an embodiment of the present invention. FIG. 1A is a perspective view showing the optical unit 100 and FIG. 1B is an exploded perspective view showing the optical unit 100. FIG. 2 is a "YZ" cross-sectional view showing the optical unit 100 in FIG. 1A.

The optical unit 100 shown in FIGS. 1A and 1B and FIG. 2 is mounted on an optical device such as a cell phone with a camera and a drive recorder. Further, the optical unit 100 is used in an optical device such as an action camera mounted on a helmet, a bicycle, a radio-controlled helicopter and the like or a wearable camera. In the optical unit 100, when a shake is occurred in the optical device at the time of photographing, disturbance occurs in a photographed image. Therefore, the optical unit 100 is structured as an optical unit with a shake correction function which is capable of correcting a shake of the optical device. Turning around the "X"-axis of the optical unit 100 corresponds to a so-called pitching (vertical swing), turning around the "Y"-axis corresponds to a so-called yawing (lateral swing), and turning around the "Z"-axis corresponds to a so-called rolling.

The optical unit 100 includes a fixed body 20, a movable body 10, a gimbal mechanism 30 structured to swingably support the movable body 10 with respect to the fixed body 20, and a drive mechanism 50 which generates magnetic drive force between the movable body 10 and the fixed body 20 for relatively displacing the movable body 10 with respect to the fixed body 20. The fixed body 20 and the movable body 10 are connected with each other through a plate-shaped spring 70. In the optical unit 100, the movable body 10 is swingably supported around a first axial line "R1" intersecting the optical axis "L" direction and is swingably supported around a second axial line "R2" intersecting the optical axis "L" direction and the first axial line "R1" direction with respect to the fixed body 20 through the gimbal mechanism 30. In this embodiment, the first axial line "R1" and the second axial line "R2" are perpendicular to the optical axis "L" direction, and the first axial line "R1" and the second axial line "R2" are perpendicular to each other.

The optical unit 100 is electrically connected with a host control section or the like which is provided on a main body side of an optical device on which the optical unit 100 is mounted through flexible circuit boards 1800 and 1900. Further, the optical unit 100 is mounted with a gyroscope 13 (shake detection sensor). The gyroscope 13 detects a shake when the shake is occurred in the optical device and outputs it to the host control device through the flexible circuit board 1900. The control device drives the drive mechanism 50 so that the movable body 10 is swung around the axial lines intersecting the optical axis "L" (first axial line "R1" and second axial line "R2") to correct the shake. The movable body 10 includes a photographing module 1 having a lens 1a whose optical axis "L" is extended along the "Z"-axis direction as an optical element. In this embodiment, when viewed in the direction of the optical axis "L", the lens 1a is circular but the movable body 10 and the fixed body 20 are formed in rectangular shapes.

(Structure of Fixed Body 20)

The fixed body 20 includes a first case 210 in a rectangular shape. The first case 210 is provided with a body part 211 in a rectangular tube shape which surrounds the movable body 10, and an end plate part 212 in a rectangular frame shape which is protruded to an inner side in a radial direction from an end part on one side "+Z" in the "Z"-axis direction of the body part 211. The end plate part 212 is formed with a rectangular opening part 212a.

The fixed body 20 includes a cover 220 which is fixed to one side "+Z" in the "Z"-axis direction of the first case 210. The cover 220 is provided with a rectangular end plate part 222 which is overlapped with the end plate part 212 of the first case 210. A circular opening part 222a is formed at a center of the end plate part 222. The cover 220 is fixed to the first case 210 in a state that the cover 220 is overlapped with the end plate part 212 of the first case 210.

The fixed body 20 includes a stopper member 240 in a rectangular frame shape, a second case 250 which holds the stopper member 240 between a body part 211 of the first case 210 and the second case 250, and a third case 260 which covers the second case 250 on the other side "−Z" in the "Z"-axis direction of the second case 250. The third case 260 is fixed to the first case 210.

The second case 250 is provided with a rectangular bottom plate part 251 and a body part 255 in a rectangular tube shape which is extended to one side "+Z" in the "Z"-axis direction from the bottom plate part 251. The bottom plate part 251 is formed with an opening part 252. The third case 260 is provided with a rectangular bottom plate part 261 and four side plate parts 265 which are bent to one side "+Z" in the "Z"-axis direction from the bottom plate part 261. The second case 250 is disposed to an inner side of the side plate parts 265. The side plate part 265 located on one side "+Y" in the "Y"-axis direction of the four side plate parts 265 is formed with a cut-out part 266 for extending the flexible circuit boards 1800 and 1900 to an outer side.

Portions 246 of the stopper member 240 protruded to inner sides are overlapped with the holder 40 of the movable body 10 on the other side "−Z" in the "Z"-axis direction. Further, an outer edge of each side of the stopper member 240 is formed with a projecting part 241 projected toward an outer side. Therefore, when the third case 260 and the first case 210 are overlapped with each other in the "Z"-axis direction, the projecting parts 241 of the stopper member 240 are held between the body part 211 of the first case 210 and the body part 255 of the second case 250.

(Structure of Movable Body 10)

The movable body 10 includes the holder 40 made of resin which holds the photographing module 1, and a weight 12 in a cylindrical tube shape which is fixed to one side "+Z" in the "Z"-axis direction of the holder 40. The weight 12 adjusts a gravity center position in the "Z"-axis direction of the movable body 10. The photographing module 1 may be structured as a fixed focus type in which the lens 1a is fixed, or may be structured as a type which includes a focusing drive mechanism for moving the lens 1a along the optical axis "L". The weight 12 is made of nonmagnetic metal, for example, brass. Therefore, magnetic attraction force is not generated between the weight 12 and magnets 52.

The movable body 10 is arranged with an imaging element 1b of the photographing module 1 which is disposed on an inner side of the holder 40. The imaging element 1b is mounted on a first mounting part 1810 of the signal outputting flexible circuit board 1800 directly or through a mounting circuit board. The flexible circuit board 1800 is provided with a curved part 1820, which is curved toward a rear side in the optical axis "L" direction (the other side "−Z" in the "Z"-axis direction) from an end part on the other side "−Y" in the "Y"-axis direction of the first mounting part 1810, a second mounting part 1830 in a rectangular shape connected with the curved part 1820 on the other side "−Y" in the "Y"-axis direction, and a leading-around part 1840 which is led around from the second mounting part 1830 to an outer side. A reinforcing plate 15 is sandwiched between the first mounting part 1810 and the second mounting part 1830 of the flexible circuit board 1800. A gyroscope 13 and electronic components 14 such as a capacitor are mounted on a face on the other side "−Z" in the "Z"-axis direction of the second mounting part 1830.

The leading-around part 1840 is divided in the "X"-axis direction through a slit 1850 extended in the "Y"-axis direction. The leading-around part 1840 is provided with a first extended part 1862 extended from one side "+Y" in the "Y"-axis direction to the other side "−Y", a curved part 1863 curved toward a rear side in the optical axis direction (the other side "−Z" in the "Z"-axis direction) from a tip end side of the first extended part 1862, and a second extended part 1864 which is extended toward one side "+Y" in the "Y"-axis direction from the curved part 1863.

A spacer 18 in a plate shape is fixed to a face on the other side "−Z" in "Z"-axis direction of the second mounting part 1830 with an adhesive. The spacer 18 is a plate member in a substantially rectangular shape, and the gyroscope 13 and the electronic components 14 are disposed to an inner side of the spacer 18. A clamp member 190 is attached to an end part on one side "+Y" in the "Y"-axis direction of the spacer 18, and the clamp member 190 and the spacer 18 holds the first extended part 1862 therebetween through an elastic sheet 195. Therefore, the first extended part 1862 is extended in a state perpendicular to the optical axis "L" direction. The second extended part 1864 is led out to an outer side through the opening part 252 of the bottom plate part 251 of the second case 250 from its midway position and is fixed to the bottom plate part 251 by a flexible sheet 19 such as a double-sided adhesive tape. A portion of the second extended part 1864 which is led out to an outer side from the opening part 252 of the bottom plate part 251 of the second case 250 is covered by the third case 260.

An end part on the other side "−Z" in the "Z"-axis direction of the movable body 10 is connected with the flexible circuit board 1900 for power feeding to coils 56 described below. The flexible circuit board 1900 is provided with a leading-around part 1940 in a strip shape which is extended from the holder 40. The leading-around part 1940 is provided with a first extended part 1962 extended from one side "+Y" in the "Y"-axis direction to the other side "−Y", a first curved part 1966 curved toward a rear side in the optical axis direction (the other side "−Z" in the "Z"-axis direction) from a tip end side of the first extended part 1962, and a second extended part 1964 which is extended toward one side "+Y" in the "Y"-axis direction from the first curved part 1966. Further, the leading-around part 1940 is provided with a second curved part 1963 which is curved toward a rear side in the optical axis direction (the other side "−Z" in the "Z"-axis direction) between the leading-out part from the movable body 10 and the first extended part 1962. The first extended part 1962 is, similarly to the first extended part 1862, held between the clamp member 190 and the spacer 18, and is extended in a state perpendicular to the optical axis "L" direction.

The second extended part 1964 is led out to an outer side through the opening part 252 of the bottom plate part 251 of the second case 250 from its midway position and is fixed to the bottom plate part 251 by a flexible sheet 19 such as a double-sided adhesive tape. A portion of the second extended part 1964 which is led out to an outer side from the opening part 252 of the bottom plate part 251 of the second case 250 is covered by the third case 260.

(Structure of Drive Mechanism 50)

In this embodiment, a drive mechanism 50 is structured between the holder 40 and the first case 210. In this embodiment, the drive mechanism 50 is a magnetic drive mechanism utilizing a magnet 52 in a plate shape and a coil 56. A coil 56 is an air-core coil and is held on one side "+X" in the "X"-axis direction of the movable body 10 (holder 40), the other side "−X" in the "X"-axis direction, one side "+Y" in the "Y"-axis direction, and the other side "−Y" in the "Y"-axis direction. Further, the magnet 52 is held by inner faces of the body part 211 of the first case 210, i.e., an inner face located on one side "+X" in the "X"-axis direction, an inner face located on the other side "−X" in the "X"-axis direction, an inner face located on one side "+Y" in the "Y"-axis direction, and an inner face located on the other side "−Y" in the "Y"-axis direction. Therefore, the magnet 52 and the coil 56 are faced each other between the holder 40 and the body part 211 of the first case 210 on each of one side "+X" in the "X"-axis direction, the other side "−X" in the "X"-axis direction, one side "+Y" in the "Y"-axis direction, and the other side "−Y" in the "Y"-axis direction.

In this embodiment, the magnet 52 is magnetized so that an outer face side pole and an inner face side pole are different from each other. Further, the magnet 52 is divided into two pieces in the optical axis "L" direction and is magnetized so that the magnetic poles facing an upper side and a lower side of the coil 56 are different from each other in the optical axis "L" direction. Therefore, upper and lower long side portions of the coil 56 are utilized as effective sides. Magnetized patterns of the four magnets 52 on an outer face side and an inner face side are the same as each other. Therefore, magnets 52 adjacent to each other in a circumferential direction are not attracted to each other and thus assembling and the like are easily performed. The first case 210 is structured of magnetic material and functions as a yoke for the magnets 52.

(Detailed Structure of Holder 40)

Figure 4A:
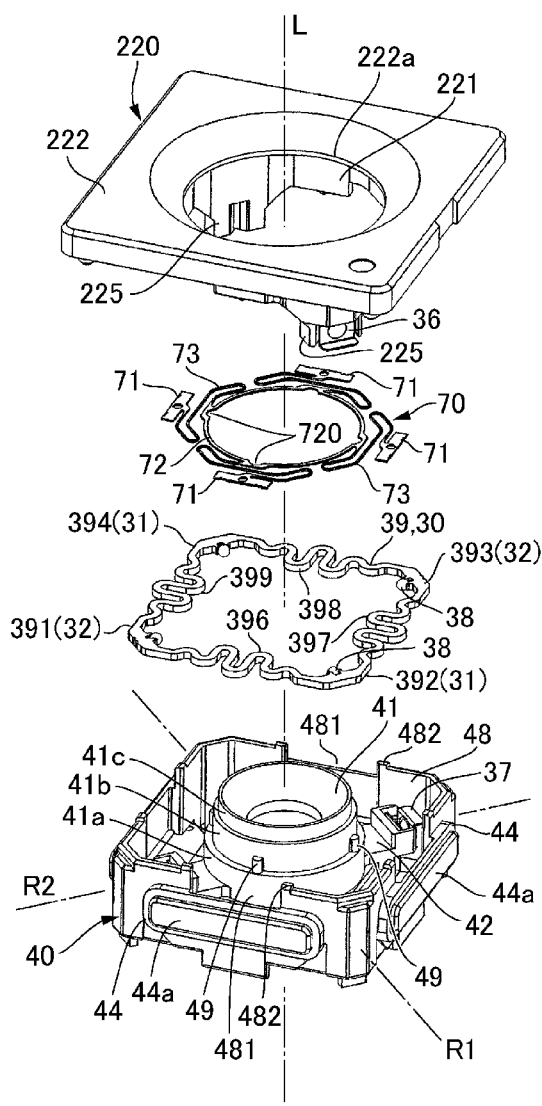
FIGS. 4A and 4B are explanatory views showing a gimbal mechanism of an optical unit in accordance with an embodiment of the present invention which is viewed from an object side.
Figure 4B:
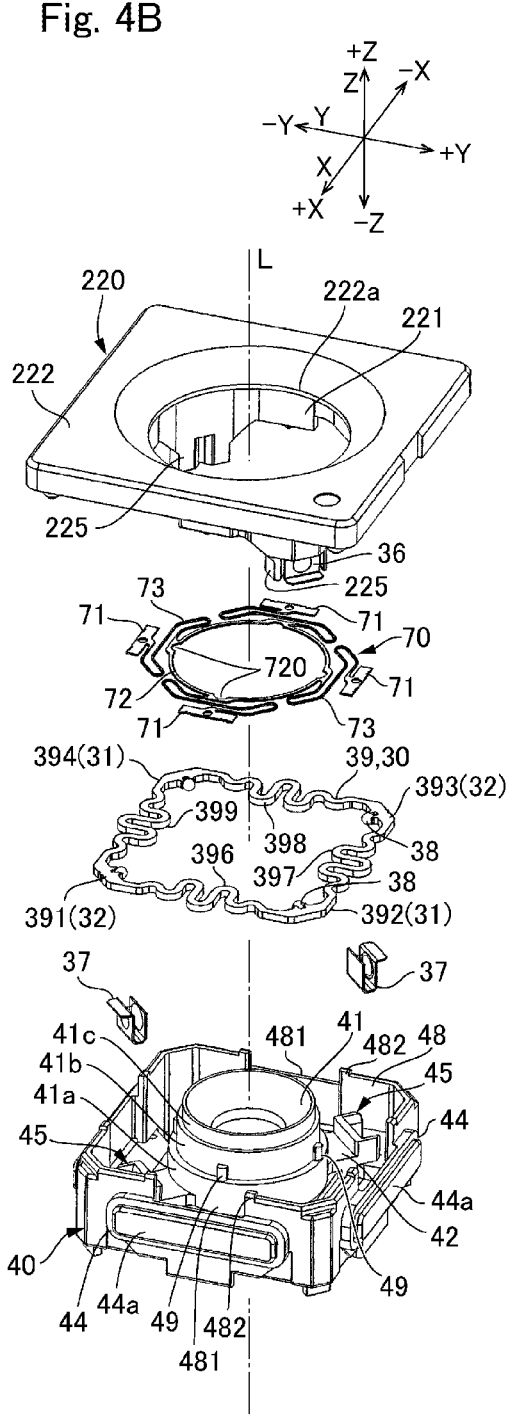

FIGS. 3A and 3B are explanatory views showing the holder 40 and the cover 220 of the optical unit 100 in accordance with an embodiment of the present invention which is viewed from an object side (one side "+Z" in the "Z"-axis direction). FIG. 3A is a perspective view showing a state that the cover 220 and the holder 40 are connected with each other through a gimbal mechanism 30 and a plate-shaped spring 70. FIG. 3B is an exploded perspective view showing a state that the cover 220 and the holder 40 are separated from each other. FIGS. 4A and 4B are explanatory views showing a gimbal mechanism 30 of the optical unit 100 in accordance with an embodiment of the present invention which is viewed from an object side (one side "+Z" in the "Z"-axis direction). FIG. 4A is an exploded perspective view showing a state that a movable frame 39 of a gimbal mechanism 30 and a plate-shaped spring 70 are separated from the holder 40. FIG. 4B is an exploded perspective view showing a state that second contact springs 37 are further separated from the holder 40.

Figures 5A, 5B:
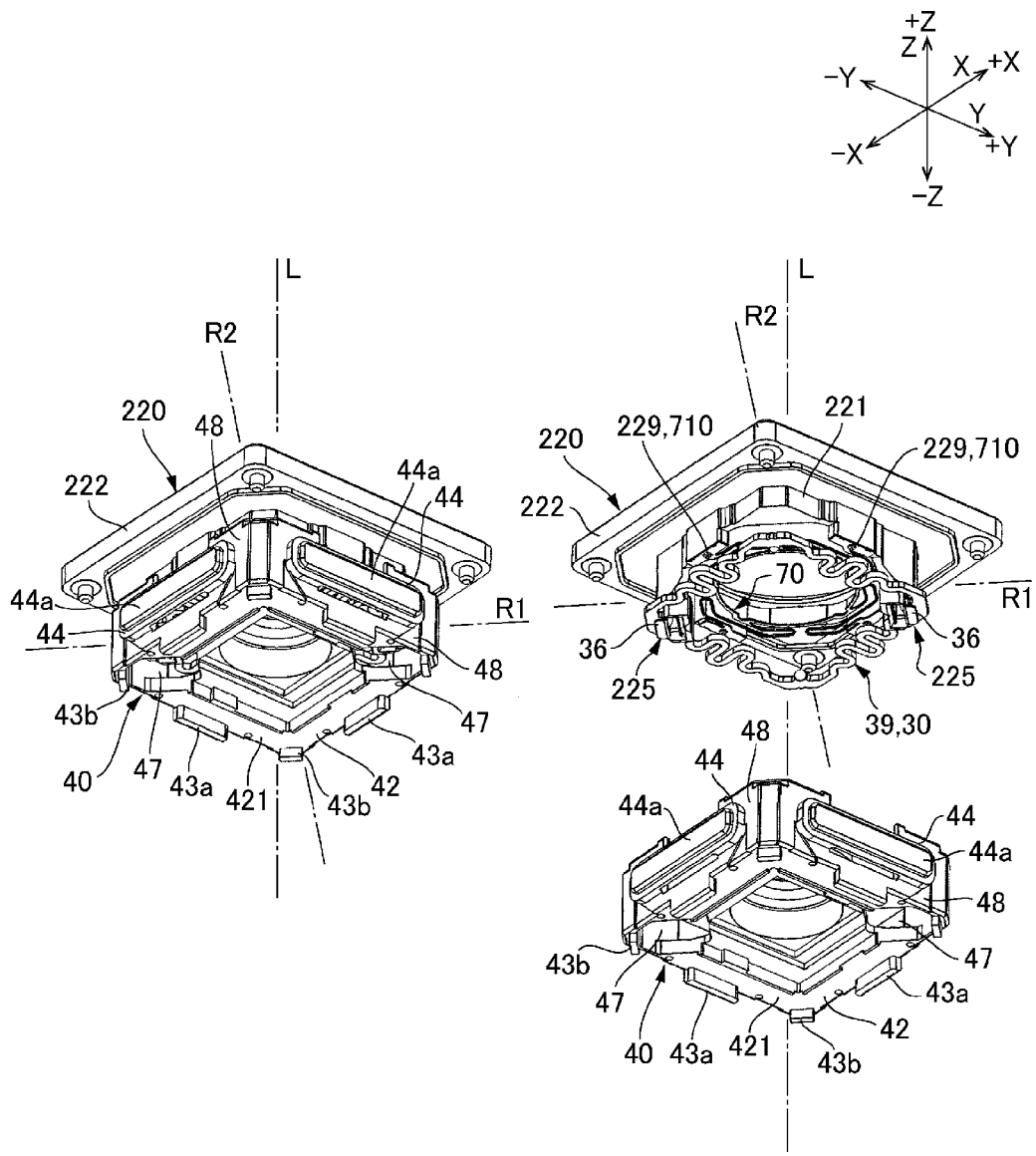
FIGS. 5A and 5B are explanatory views showing a holder and a cover of an optical unit in accordance with an embodiment of the present invention which is viewed from an opposite side to an object side.

FIGS. 5A and 5B are explanatory views showing the holder 40 and the cover 220 of the optical unit 100 in accordance with an embodiment of the present invention which is viewed from an opposite side (other side "−Z" in the "Z"-axis direction) to an object side (one side "+Z" in the "Z"-axis direction). FIG. 5A is a perspective view showing a state that the cover 220 and the holder 40 are connected with each other through a gimbal mechanism 30 and a plate-shaped spring 70. FIG. 5B is an exploded perspective view showing a state that the cover 220 and the holder 40 are separated from each other. FIGS. 6A and 6B are explanatory views showing a gimbal mechanism 30 of the optical unit 100 in accordance with an embodiment of the present invention which is viewed from an opposite side (other side "−Z" in the "Z"-axis direction) to an object side (one side "+Z" in the "Z"-axis direction). FIG. 6A is an exploded perspective view showing a state that a movable frame 39 of a gimbal mechanism 30 and a plate-shaped spring 70 are separated from the holder 40. FIG. 6B is an exploded perspective view showing a state that first contact springs 36 are further separated from the holder 40.

As shown in FIGS. 2 through 6B, the holder 40 of the movable body 10 structures an outer peripheral portion of the movable body 10. The holder 40 is generally provided with a bottom plate part 42 and a cylindrical tube part 41 holding the photographing module 1 on its inner side on one side "+Z" in the "Z"-axis direction of the bottom plate part 42. A side plate part 48 is formed at an outer side edge of the bottom plate part 42 of the holder 40 so as to surround the cylindrical tube part 41. A space where the movable frame 39 of the gimbal mechanism 30 is disposed is formed between the side plate part 48 and the cylindrical tube part 41. An outer face of the side plate part 48 is formed with coil holding parts 44 of protruded parts. Coils 56 are held by the holder 40 with an adhesive or the like in a state that the coils 56 are fitted to the coil holding parts 44. The coil holding part 44 is formed with a protruded part 44a protruding toward an outer side on an inner side of the coil 56. A part of the protruded part 44a is protruded from an outer face (face facing the magnet 52) of the coil 56 and faces the magnet 52. Therefore, when the movable body 10 is displaced in the "X"-axis direction or the "Y"-axis direction by external force, the protruded part 44a of the coil holding part 44 can be abutted with the magnet 52 to restrict its movable range. In this manner, a stopper for restricting a movable range of the movable body 10 in a direction perpendicular to the optical axis "L" direction is structured between the fixed body 20 and the movable body 10 by the protruded part 44a of the coil holding part 44 and the magnet 52.

A penetration part 47 penetrating through the bottom plate part 42 in the "Z"-axis direction is formed in the holder 40 at two positions separated from each other in the first axial line "R1" direction so as to interpose the cylindrical tube part 41 therebetween. Further, protruded parts 43a and 43b protruding from the bottom face 421 to the other side "−Z" in the "Z"-axis direction are formed on the other side "−Z" in the "Z"-axis direction of the holder 40. In this embodiment, the protruded parts 43a are provided so as to extend along sides of the holder 40 and the protruded parts 43b are provided at corners of the holder 40. The protruded parts 43a and 43b structure a stopper which is structured to abut with the stopper member 240 when the movable body 10 is displaced to the other side "−Z" in the "Z"-axis direction to restrict a movable range to the other side "−Z" in the "Z"-axis direction of the movable body 10.

A cut-out part 481 is formed at a substantially center portion in a side direction of each of the side plate parts 48 of the holder 40 on one side "+X" in the "X"-axis direction, the other side "−X" in the "X"-axis direction, one side "+Y" in the "Y"-axis direction and the other side "−Y" of "Y"-axis direction. Protruded parts 482 protruded toward one side "+Z" in the "Z"-axis direction are formed at end parts adjacent to the cut-out part 481 of the side plate part 48. Therefore, the holder 40 is formed with two protruded parts 482 on both sides of the cut-out part 481 on each of one side "+X" in the "X"-axis direction, the other side "−X" in the "X"-axis direction, one side "+Y" in the "Y"-axis direction, and the other side "−Y" in the "Y"-axis direction. Accordingly, when the movable body 10 is turned around the first axial line "R1" or around the second axial line "R2", the protruded part 482 can be abutted with the cover 220 to restrict a swing range of the movable body 10. In this manner, a stopper for restricting a swing range of the movable body 10 is structured between the fixed body 20 and the movable body 10 by the protruded parts 482 and the cover 220.

The cylindrical tube part 41 of the holder 40 is provided with a large diameter part 41a on a root side (the other side "−Z" in the "Z"-axis direction), a medium diameter part 41b formed on a tip end side (the other side "+Z" in the "Z"-axis direction) of the large diameter part 41*a*, and a small diameter part 41*c* formed on a tip end side (the other side "+Z" in the "Z"-axis direction) of the medium diameter part 41*b*. An end face on one side "+Z" in the "Z" direction of the large diameter part 41*a* (side face of the medium diameter part 41*b*) is formed with a protruded part 49 protruded to one side "+Z" in the "Z" direction at a plurality of positions in a circumferential direction. In this embodiment, the protruded part 49 is formed at totaled four positions with an equal angular interval, i.e., one side "+X" in the "X"-axis direction, the other side "−X" in the "X"-axis direction, one side "+Y" in the "Y"-axis direction, and the other side "−Y" in the "Y"-axis direction. The protruded parts 49 are portions for adhesion for connecting a plate-shaped spring 70 with the holder 40. The weight 12 is fixed to the small diameter part 41*c* of the cylindrical tube part 41.

The holder 40 is formed with a second contact point support part 45 protruded and opened toward one side "+Z" in the "Z"-axis direction at two positions separated from each other in the second axial line "R2" direction (line connecting corner parts at diagonal positions of the rectangular holder 40 with each other). The second contact point support part 45 is a support part for the second contact spring 37 described below and is disposed between the cylindrical tube part 41 and the corner parts of the substantially rectangular side plate part 48 formed so as to surround the cylindrical tube part 41.

(Detailed Structure of Cover 220)

The cover 220 is a resin molding having a substantially quadrangular planar shape. The cover 220 is provided around the opening part 222*a* with a rectangular frame part 221 which is protruded from the end plate part 222 to the other side "−Z" in the "Z"-axis direction. A face on the other side "−Z" in the "Z"-axis direction of the frame part 221 is formed with protruded parts 229 which are protruded toward the other side "−Z" in the "Z"-axis direction at center portions in side directions. The protruded parts 229 are portions for adhesion for connecting the plate-shaped spring 70 with the cover 220.

The cover 220 is formed with a protruded part 224 which is protruded to the other side "−Z" in the "Z"-axis direction at each of four corner portions of the end plate part 222. The protruded part 224 is a positioning protruded part which is fitted into a hole 214 formed in each of corner portions of the end plate part 212 of the first case 210 shown in FIG. 1B.

The frame part 221 of the cover 220 is formed with a pillar shaped part 226 protruded toward the other side "−Z" in the "Z"-axis direction at two positions separated from each other in the first axial line "R1" direction (line connecting corner parts at diagonal positions of the rectangular cover 220 with each other). A first contact point support part 225 formed in a plate shape is formed at an end part on the other side "−Z" in the "Z"-axis direction of the pillar shaped part 226. The first contact point support part 225 is a support part for the first contact spring 36 described below. When the cover 220 and the holder 40 are assembled and integrated with each other, the first contact point support parts 225 are disposed between the cylindrical tube part 41 of the holder 40 and the corner parts of the substantially rectangular side plate part 48 formed so as to surround the cylindrical tube part 41.

(Structure of Plate-Shaped Spring 70)

A plate-shaped spring 70 for determining a posture of the movable body 10 when the drive mechanism 50 is set in a stopped state is provided between the movable body 10 and the fixed body 20. In this embodiment, the plate-shaped spring 70 is a spring member which is formed by etching a metal plate in a predetermined shape. The plate-shaped spring 70 is provided with fixed body side connection parts 71 connected with the fixed body 20, a movable body side connection part 72 connected with the movable body 10, and arm parts 73 in a plate spring shape which connect the fixed body side connection parts 71 with the movable body side connection part 72. The arm parts 73 are comprised of four (4) pieces and are extended from the fixed body side connection parts 71 to the movable body side connection part 72 while turning around from one side in a circumferential direction to the other side. Four fixed body side connection parts 71 are provided so as to correspond to four arm parts 73 in a one-to-one relationship. In this embodiment, the fixed body side connection part 71 is disposed at two positions interposing the optical axis "L" on both sides in the "X"-axis direction and at two positions interposing the optical axis "L" on both sides in the "Y"-axis direction.

Each of four fixed body side connection parts 71 is formed with a penetration part 710 of a hole into which the protruded part 229 of the cover 220 is fitted. Therefore, the protruded part 229 of the cover 220 is fitted to the penetration part 710 of the fixed body side connection part 71 and the protruded part 229 and the fixed body side connection part 71 can be fixed by an adhesive. In this embodiment, the penetration part 710 is formed in a root portion of the fixed body side connection part 71 with which the arm part 73 is connected.

The movable body side connection part 72 is structured so that end parts on the other side of the four arm parts 73 are extended in a circumferential direction and are connected with each other in a ring shape. Further, an inner circumferential edge of the movable body side connection part 72 is formed with penetration parts 720 of cut-out parts to which the protruded parts 49 of the holder 40 are fitted. In this embodiment, the penetration part 720 is formed at totaled four (4) positions, i.e., two positions interposing the optical axis "L" on both sides in the "X"-axis direction and two positions interposing the optical axis "L" on both sides in the "Y"-axis direction. Therefore, the protruded parts 49 formed on the holder 40 are fitted to the penetration parts 720 of the movable body side connection part 72 and, in this state, the protruded parts 49 and the movable body side connection part 72 can be fixed to each other by an adhesive. In this embodiment, the penetration parts 720 are formed in root portions of the movable body side connection part 72 which are connected with the arm parts 73.

(Structure of First Swing Support Point 31 of Gimbal Mechanism 30)

Figure 7A:
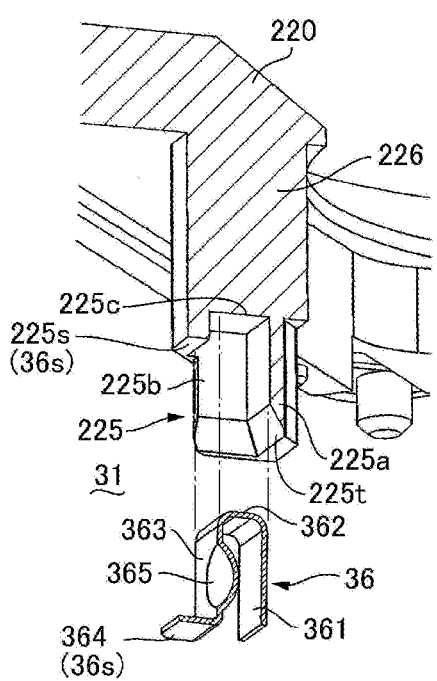
FIGS. 7A, 7B and 7C are explanatory views showing a first swing support point of an optical unit in accordance with an embodiment of the present invention which is viewed from an opposite side to an object side.
Figure 7A:
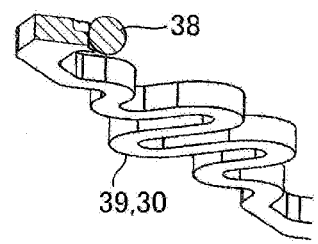
Figure 7B:
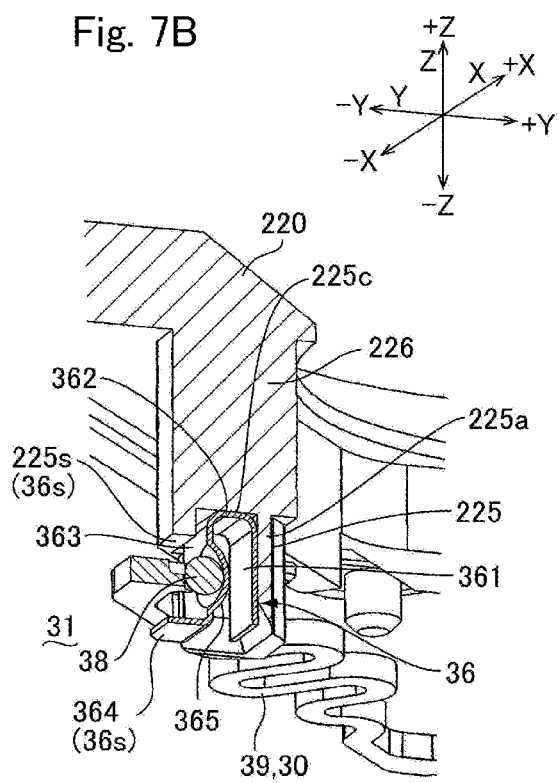
Figure 7C:
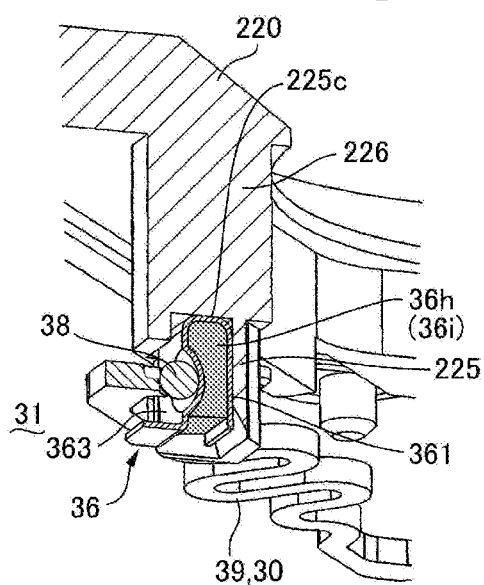

FIGS. 7A, 7B and 7C are explanatory views showing a first swing support point 31 of the optical unit 100 in accordance with an embodiment of the present invention which is viewed from an opposite side (the other side "−Z" in the "Z"-axis direction) to an object side (one side "+Z" in the "Z"-axis direction). FIG. 7A is an exploded perspective view showing a first swing support point 31, FIG. 7B is a perspective view showing the first swing support point 31, and FIG. 7C is a perspective view showing a state that a fixing member is provided in the first swing support point 31.

As shown in FIGS. 3A through 6B, the gimbal mechanism 30 includes the movable frame 39, a first swing support point 31 provided between the movable frame 39 and the fixed body 20 at two (2) positions separated in the first axial line "R1" direction, and a second swing support point 32 provided between the movable frame 39 and the movable body 10 at two (2) positions separated in the second axial line "R2" direction. In the first swing support point 31, the movable frame 39 is supported by a first contact spring 36 which is held by the fixed body 20 (cover 220) and, in the second swing support point 32, the movable frame 39 is supported by a second contact spring 37 which is held by the movable body 10 (holder 40). In this embodiment, a magnetic drive mechanism is used as the drive mechanism 50 and thus each of the movable frame 39, the first contact spring 36 and the second contact spring 37 used in the gimbal mechanism 30 is made of nonmagnetic material such as "SUS 305".

As shown in FIGS. 4A and 4B and FIGS. 6A and 6B, the movable frame 39 is formed in a rectangular frame shape which is provided with a first corner part 391, a second corner part 392, a third corner part 393 and a fourth corner part 394 around the optical axis "L". Further, the movable frame 39 is provided with a first connecting part 396, a second connecting part 397, a third connecting part 398 and a fourth connecting part 399 between the first corner part 391 and the second corner part 392, between the second corner part 392 and the third corner part 393, between the third corner part 393 and the fourth corner part 394, and between the fourth corner part 394 and the first corner part 391.

In this embodiment, the first connecting part 396, the second connecting part 397, the third connecting part 398 and the fourth connecting part 399 are respectively provided with a meandering part that is curved in a direction perpendicular to each extending direction and the "Z"-axis direction. Therefore, the movable frame 39 is capable of elastically deforming in a direction perpendicular to the optical axis "L" direction.

A spherical body 38 made of nonmagnetic metal material is fixed by welding to inner sides of the first corner part 391, the second corner part 392, the third corner part 393 and the fourth corner part 394 of the movable frame 39. The spherical body 38 forms a protruded part whose hemispheric convex surface faces to an inner side of the movable frame 39. In this embodiment, the thickness of portions to which the spherical bodies 38 are fixed in the first corner part 391, the second corner part 392, the third corner part 393 and the fourth corner part 394 of the movable frame 39 is set to be thinner than the thicknesses of other portions. The movable frame 39 is formed by etching a metal plate in a predetermined shape. In this case, when a width of the movable frame 39 is smaller than its thickness, the movable frame 39 is hard to be manufactured by etching one piece of metal plate. Therefore, two metal plates are respectively etched and overlapped with each other to structure the movable frame 39.

In the first corner part 391, the second corner part 392, the third corner part 393 and the fourth corner part 394 in this embodiment, the first swing support point 31 described with reference to FIGS. 7A, 7B and 7C is provided in the second corner part 392 and the fourth corner part 394 which are located at diagonal positions in the first axial line "R1" direction, and the second swing support point 32 described with reference to FIGS. 8A, 8B and 8C is provided in the first corner part 391 and the third corner part 393 which are located at diagonal positions in the second axial line "R2" direction.

As shown in FIGS. 7A and 7B, the first contact spring 36 is held by the cover 220 in the first swing support point 31 and the spherical body 38 of the movable frame 39 is supported by the cover 220 through the first contact spring 36. The first contact spring 36 is made of metal and formed in a plate shape and is provided with a movable plate part 363 receiving the spherical body 38 of the movable frame 39 and a fixed plate part 361 which is bent back from an end part of the movable plate part 363 to an opposite side to the spherical body 38. The movable plate part 363 is provided with a contact point part 365 in a concave shape which receives the spherical body 38 fixed to the movable frame 39 on inner sides of the second corner part 392 and the fourth corner part 394 of the movable frame 39. In this embodiment, the contact point part 365 is formed in a hemispheric recessed part. In the first contact spring 36, the movable plate part 363 and a bent portion 362 in a "U"-shape between the movable plate part 363 and the fixed plate part 361 exhibit elasticity which applies an elastic load to the contact point part 365 with which the movable frame 39 is contacted.

In order to fix the first contact spring 36 to the cover 220, a first contact point support part 225 of the cover 220 is provided with a first wall part 225a whose outer face side is fixed with the fixed plate part 361 with an adhesive, a pair of second wall parts 225b located on both sides of the first contact spring 36, and a third wall part 225c which supports the bent portion 362. A space surrounded by the first wall part 225a, the second wall parts 225b and the third wall part 225c is opened toward the other side "−Z" in the "Z"-axis direction and is configured as a spring holding part to which the first contact spring 36 is attached from the other side "−Z" in the "Z"-axis direction. In this embodiment, portions of an inner face of the first wall part 225a and inner faces of the second wall parts 225b which are located on the other side "−Z" in the "Z"-axis direction are formed to be tapered faces 225t which are inclined so that an opening of a space surrounded by the first wall part 225a and the second wall parts 225b is increased.

In this embodiment, the cover 220 is formed with a protruded part 225s which is protruded to the other side "−Z" in the "Z"-axis direction from the third wall part 225c so as to be partially overlapped with the movable plate part 363 on an opposite side to the fixed plate part 361. Further, the first contact spring 36 is provided with a plate part 364 which is bent from an end part on the other side "−Z" in the "Z"-axis direction of the movable plate part 363 to an opposite side to the fixed plate part 361, and the contact point part 365 is located between the protruded part 225s and the plate part 364 in the "Z"-axis direction. Therefore, as shown in FIG. 7B, when the spherical body 38 of the movable frame 39 is supported by the contact point part 365, the protruded part 225s and the plate part 364 structure a first stopper 36s which restricts a movable range of the spherical body 38 of the movable frame 39 in the "Z"-axis direction. The first stopper 36s prevents the spherical body 38 from disengaging from the contact point part 365 in the "Z"-axis direction when the movable frame 39 is displaced in the "Z"-axis direction.

In the first swing support point 31 structured as described above, the movable plate part 363 receives the spherical body 38 in a state elastically deformed toward the fixed plate part 361 side when the movable frame 39 is supported by the first contact spring 36. In this state, the first contact spring 36 is, as shown in FIG. 7C, provided with a fixing member 36h by which the movable plate part 363 and the fixed plate part 361 are fixed to each other. Therefore, the movable plate part 363 is not deformed.

In this embodiment, the fixing member 36h is an adhesive 36i which is applied between the fixed plate part 361 and the movable plate part 363 and then solidified. An epoxy-based adhesive is used as the adhesive 36i in this embodiment. In this case, the phrase "an adhesive 36i is applied between the fixed plate part 361 and the movable plate part 363" includes a state that the adhesive 36*i* is substantially completely filled between the fixed plate part 361 and the movable plate part 363 and, in addition, the phrase also includes a state that the adhesive is existed in a part between the fixed plate part 361 and the movable plate part 363 so that the movable plate part 363 is fixed to the fixed plate part 361 by the adhesive. For example, since an adhesive is applied from an open end side of the first contact spring 36, in other words, from an opposite side to the "U"-shaped bent portion 362, the adhesive may be reached and filled to a center portion of the contact point part 365 which is a hemispheric recessed part (narrowest portion between the contact point part 365 and the fixed plate part 361) from an open end side, or the adhesive may be filled on only an open end side relative to the contact point part 365 (only a lower side relative to the contact point part 365 in FIG. 7C).

An adhesive used as the fixing member 36*h* for fixing the movable plate part 363 to the fixed plate part 361 is basically sufficient that, even when force from the outside such as a disturbance is applied, the movable plate part 363 after having been fixed is not deformed. However, it is preferable to use an adhesive 36*i* which is cured at room temperature and does not shrink at the time of curing and has elasticity after being cured. In a case of using a thermosetting adhesive, the first wall part 225*a* becomes bent to an outer side at a high temperature and the fixed plate part 361 is resiliently bent toward the movable plate part 363. In this state, when the first wall part 225*a* is returned to its original state at a room temperature after the thermosetting adhesive is cured, an elastic force of the first contact spring 36 may be varied and weakened from the desired elastic force. On the other hand, when an adhesive which is cured at a room temperature (cold setting adhesive) is used, the situation can be avoided. As an elastic adhesive described above, for example, a silicon-based adhesive or a rubber-based adhesive may be used and the spring constant in a state that the elastic adhesive is applied to the first contact spring 36 is about 3-10 kg f/mm. In a case that an elastic adhesive having elasticity after being cured is used, even when force from the outside such as a disturbance is applied to the movable frame 39, the first contact spring 36 and the like after the elastic adhesive has been cured, the force can be absorbed by the adhesive having elasticity after being cured. Therefore, pressurization to the movable frame 39 by the first contact spring 36 is prevented from being varied and thus its impact resistance can be improved.

(Structure of Second Swing Support Point 32 of Gimbal Mechanism 30)

FIGS. 8A, 8B and 8C are explanatory views showing a second swing support point 32 of the optical unit 100 in accordance with an embodiment of the present invention which is viewed from an object side (one side "+Z" in the "Z"-axis direction). FIG. 8A is an exploded perspective view showing a second swing support point 32, FIG. 8B is a perspective view showing the second swing support point 32, and FIG. 8C is a perspective view showing a state that a fixing member is provided in the second swing support point 32.

As shown in FIGS. 8A and 8B, the second contact spring 37 is held in the second swing support point 32 by the holder 40 and the spherical body 38 of the movable frame 39 is supported by the holder 40 through the second contact spring 37. The second contact spring 37 is, similarly to the first contact spring 36, made of metal and formed in a plate shape and is provided with a movable plate part 373 receiving the spherical body 38 of the movable frame 39 and a fixed plate part 371 which is bent back from an end part of the movable plate part 373 to an opposite side to the spherical body 38. The movable plate part 373 is provided with a contact point part 375 in a concave shape which receives the spherical body 38 fixed to the movable frame 39 on inner sides of the first corner part 391 and the third corner part 393 of the movable frame 39. In this embodiment, the contact point part 375 is formed in a hemispheric recessed part. In the second contact spring 37, the movable plate part 373 and a bent portion 372 in a "U"-shape between the movable plate part 373 and the fixed plate part 371 exhibit elasticity which applies an elastic load to the contact point part 375 with which the movable frame 39 is contacted.

In order to fix the second contact spring 37 to the holder 40, a second contact point support part 45 of the holder 40 is provided with a first wall part 45*a* whose outer face side is fixed to the fixed plate part 371 with an adhesive or the like, a pair of second wall parts 45*b* located on both sides of the second contact spring 37, and a third wall part 45*c* which supports the bent portion 372. A space surrounded by the first wall part 45*a*, the second wall parts 45*b* and the third wall part 45*c* is opened toward one side "+Z" in the "Z"-axis direction and is configured as a spring holding part to which the second contact spring 37 is attached from one side "+Z" in the "Z"-axis direction. In this embodiment, portions of an inner face of the first wall part 45*a* and inner faces of the second wall parts 45*b* which are located on one side "+Z" in the "Z"-axis direction are formed to be tapered faces 45*t* which are inclined so that an opening of a space surrounded by the first wall part 45*a* and the second wall parts 45*b* is increased.

In this embodiment, the holder 40 is formed with a protruded part 45*s* which is protruded to one side "+Z" in the "Z"-axis direction from the third wall part 45*c* so as to be partially overlapped with the movable plate part 373 on an opposite side to the fixed plate part 371. Further, the second contact spring 37 is provided with a plate part 374 which is bent from an end part on one side "+Z" in the "Z"-axis direction of the movable plate part 373 to an opposite side to the fixed plate part 371, and the contact point part 375 is located between the protruded part 45*s* and the plate part 374 in the "Z"-axis direction. Therefore, as shown in FIG. 8B, when the spherical body 38 of the movable frame 39 is supported by the contact point part 375, the protruded part 45*s* and the plate part 374 structure a second stopper 37*s* which restricts a movable range of the spherical body 38 of the movable frame 39 in the "Z"-axis direction. The second stopper 37*s* prevents the spherical body 38 from disengaging from the contact point part 375 in the "Z"-axis direction when the movable frame 39 is displaced in the "Z"-axis direction.

In the second swing support point 32 structured as described above, the movable plate part 373 receives the spherical body 38 in a state elastically deformed toward the fixed plate part 371 side when the movable frame 39 is supported by the second contact spring 37. In this state, the second contact spring 37 is, as shown in FIG. 8C, provided with a fixing member 37*h* by which the movable plate part 373 and the fixed plate part 371 are fixed to each other. Therefore, the movable plate part 373 is not deformed.

In this embodiment, the fixing member 37*h* is an adhesive 37*i* which is applied between the fixed plate part 371 and the movable plate part 373 and then solidified. An epoxy-based adhesive is used as the adhesive 37*i* in this embodiment. Similarly to the case of the first contact spring 36, the adhesive 37*i* may be substantially completely filled between the fixed plate part 371 and the movable plate part 373. Alternatively, the adhesive 37*i* may be filled on only an opposite side to the "U"-shaped bent portion 372, for example, the adhesive 37*i* may be applied from an open end side so as to be reached and filled to a center portion of the contact point part 375 which is a hemispheric recessed part (narrowest portion between the contact point part 375 and the fixed plate part 371). Further, similarly to the adhesive 36*i*, an elastic adhesive 37*i* which is cured at a room temperature and does not shrink at the time of curing and has elasticity after being cured may be used, for example, an elastic adhesive such as a silicon-based adhesive or a rubber-based adhesive may be used.

(Structure and Basic Operation of Drive Mechanism 50 and the Like)

In the optical unit 100 structured as described above, when the optical device is shaken, the shake is detected by the gyroscope 13 and a control IC (not shown) controls the drive mechanism 50. In other words, a drive current for canceling the shake detected by the gyroscope 13 is supplied to the coils 56. In this case, balance of the electric currents supplied to the four coils 56 is controlled. As a result, the movable body 10 is swung around the first axial line "R1" and is swung around the second axial line "R2" and the shake of hand is corrected.

In this embodiment, the movable frame 39 is located at the same height position as the coil holding parts 44 (same position in the "Z"-axis direction). Therefore, when viewed in a direction perpendicular to the optical axis "L" direction, the gimbal mechanism 30 is provided at a position overlapped with the drive mechanism 50. Especially, in this embodiment, when viewed in a direction perpendicular to the optical axis "L" direction, the gimbal mechanism 30 is provided at a position overlapped with the center in the "Z"-axis direction of the drive mechanism 50. Further, in the optical axis "L" direction, a gravity center position of the movable body 10 is set at the same position as the movable frame 39 by the weight 12. Therefore, the drive mechanism 50 is capable of driving the movable body 10 appropriately.

(Manufacturing Method of Optical Unit 100)

When the gimbal mechanism 30 is to be structured in order to manufacture the optical unit 100 in this embodiment, the movable frame 39 is supported by the first contact springs 36 and then the movable plate part 363 and the fixed plate part 361 are fixed to each other by the fixing member 36*h*. Further, when the gimbal mechanism 30 is to be structured, the movable frame 39 is supported by the second contact springs 37 and then the movable plate part 373 and the fixed plate part 371 are fixed to each other by the fixing member 37*h*.

For example, as shown in FIGS. 8A, 8B and 8C, the movable frame 39 is supported by the second contact springs 37 and then an adhesive 37*i* is applied between the movable plate part 373 and the fixed plate part 371. After that, the adhesive 37*i* is cured and the movable plate part 373 and the fixed plate part 371 are fixed to each other by the adhesive 37*i* (fixing member 37*h*).

Next, as shown in FIGS. 7A, 7B and 7C, the movable frame 39 is supported by the first contact springs 36 and then the adhesive 36*i* is applied between the movable plate part 363 and the fixed plate part 361. After that, the adhesive 36*i* is cured and the movable plate part 363 and the fixed plate part 361 are fixed to each other by the adhesive 36*i* (fixing member 36*h*). In this case, the first contact springs 36 are covered by the cover 220 and the holder 40. However, in this embodiment, the movable body 10 (holder 40) is formed with penetration parts 47 which are overlapped with the two first swing support points 31 in the optical axis direction (see FIGS. 5A and 5B and FIGS. 6A and 6B). Therefore, even when the first contact springs 36 are covered by the cover 220 and the holder 40, the adhesive 36*i* (fixing member 36*h*) can be applied (provided) to the first contact springs 36 through the penetration parts 47.

In a case that, after the movable frame 39 is supported by the first contact springs 36, the movable frame 39 is supported by the second contact springs 37, the second contact springs 37 are covered by the cover 220 and the holder 40. In this case, it may be structured that the fixed body 20 (cover 220) is formed with opening parts overlapping with the two second swing support points 32 in the optical axis direction and the adhesive 37*i* (fixing member 37*h*) is provided in the second contact springs 37 through the opening parts.

(Principal Effects in this Embodiment)

As described above, in the optical unit 100 in accordance with this embodiment, the first swing support point 31 and the second swing support point 32 of the gimbal mechanism 30 include the first contact spring 36 and the second contact spring 37. Therefore, an appropriate load can be applied to the contact point part 365 contacting with the spherical body 38 in the first swing support point 31 and to the contact point part 375 contacting with the spherical body 38 in the second swing support point 32. Accordingly, a swing can be smoothly performed in both directions in the first swing support point 31 and the second swing support point 32, and an unnecessary shake of the movable body 10 due to a shake or the like transmitted from the outside can be restrained.

In this embodiment, when the gimbal mechanism 30 is to be structured, after the movable frame 39 is supported by the first contact spring 36, the movable plate part 363 elastically deformed and the fixed plate part 361 are fixed to each other by the fixing member 36*h*. Further, after the movable frame 39 is supported by the second contact spring 37, the movable plate part 373 elastically deformed and the fixed plate part 371 are fixed to each other by the fixing member 37*h*. Therefore, even when a falling load or the like is applied, the movable plate part 363 of the first contact spring 36 and the movable plate part 373 of the second contact spring 37 are hard to be deformed and thus the movable frame 39 is supported by the first contact spring 36 and the second contact spring 37 in a state that appropriate loads are applied from the first contact spring 36 and the second contact spring 37. Accordingly, even when the movable frame 39 is supported by the first contact spring 36 and the second contact spring 37, lowering of impact resistance can be restrained. Further, lowering of loads applied to the movable frame 39 by the first contact spring 36 and the second contact spring 37 due to deformation of the first contact spring 36 and the second contact spring 37 is hard to be occurred. Therefore, positional displacement of the movable frame 39 due to a shake applied from the outside is hard to be occurred. Accordingly, a situation is hard to be occurred that the movable frame 39 is disengaged from the first contact spring 36 and the second contact spring 37 and the movable frame 39 is not supported.

Especially, in this embodiment, the movable frame 39 is capable of elastically deforming in a direction perpendicular to the optical axis "L" direction and thus the movable frame 39 is elastically abutted with the contact point parts 365 and 375 of the first swing support point 31 and the second swing support point 32 by its own spring force. Therefore, even after the movable plate part 363 and the fixed plate part 361 of the first contact spring 36 are fixed by the fixing member 36*h* and, even after the movable plate part 373 and the fixed plate part 371 of the second contact spring 37 are fixed by the fixing member 37*h*, the movable frame 39 is applied with an appropriate load in the first swing support point 31 and the second swing support point 32 by spring force of the movable frame 39 itself.

The plate part 364 of the first contact spring 36 and the protruded part 225s of the fixed body 20 (cover 220) which are overlapped with the movable frame 39 on both sides in the optical axis "L" direction structure the first stopper 36s which determines a movable range in the optical axis "L" direction of the abutting portion (spherical body 38) of the movable frame 39 with the first contact spring 36. Further, the plate part 374 of the second contact spring 37 and the protruded part 45s of the movable body 10 (holder 40) which are overlapped with the movable frame 39 on both sides in the optical axis "L" direction structure the second stopper 37s which determines a movable range in the optical axis "L" direction of the abutting portion (spherical body 38) of the movable frame 39 with the second contact spring 37. Therefore, even when a shake is applied to the movable frame 39 from the outside so as to move the movable frame 39 in the optical axis direction, the movable frame 39 is hard to be disengaged from the first contact spring 36 and the second contact spring 37.

The fixing members 36h and 37h are the adhesives 36i and 37i and thus, after the adhesives 36i and 37i are applied between the fixed plate part 361 and the movable plate part 363 and between the fixed plate part 371 and the movable plate part 373, the adhesives 36i and 37i are solidified. Therefore, the fixing members 36h and 37h can be provided easily. Further, the adhesives 36i and 37i are in a liquid state before being solidified and thus, regardless of shapes of the first contact spring 36 and the second contact spring 37, the adhesives 36i and 37i can be applied between the fixed plate part 361 and the movable plate part 363 and between the fixed plate part 371 and the movable plate part 373. Therefore, the fixed plate part 361 and the movable plate part 363 can be fixed surely and the fixed plate part 371 and the movable plate part 373 can be fixed surely.

The first swing support point 31 is structured between the cover 220 of the fixed body 20 and the movable frame 39 and thus the number of members structuring the gimbal mechanism 30 can be reduced.

The first contact spring 36 is provided on the fixed body 20 side and the second contact spring 37 is provided on the movable body 10 side and thus the structure can be simplified in comparison with a case that the contact springs are provided on the movable frame 39.

Modified Embodiment

Figure 9A:
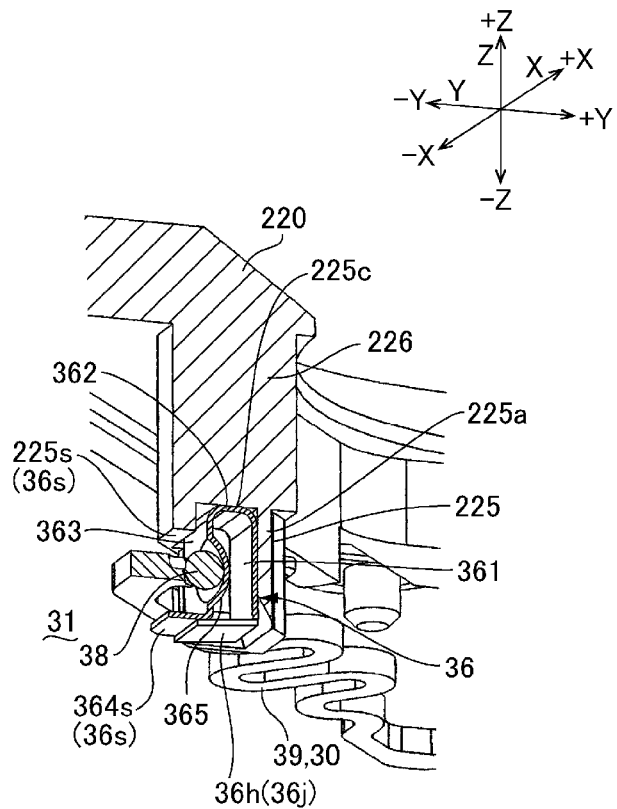
FIGS. 9A and 9B are explanatory views showing a modified example of a fixing member provided in an optical unit in accordance with an embodiment of the present invention.
Figure 9B:
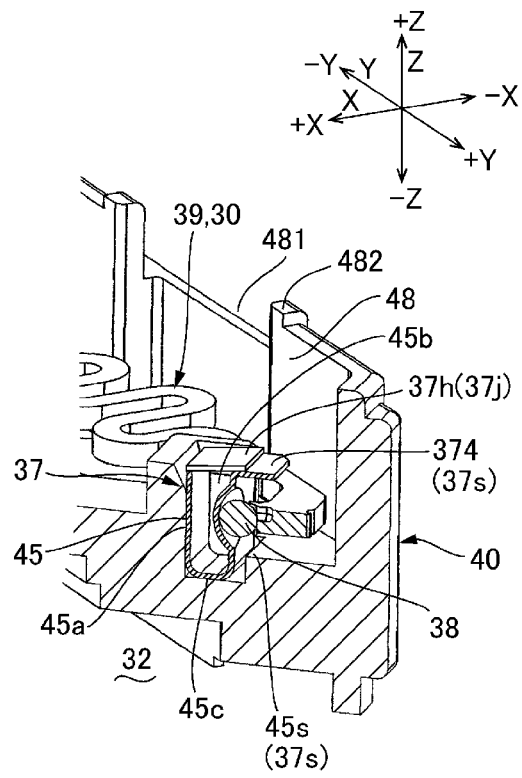

FIGS. 9A and 9B are explanatory views showing a modified example of the fixing members 36h and 37h provided in the optical unit 100 in accordance with an embodiment of the present invention. FIG. 9A is an explanatory view showing a first swing support point 31 which is viewed from an opposite side (the other side "−Z" in the "Z"-axis direction) to an object side (one side "+Z" in the "Z"-axis direction), and FIG. 9B is an explanatory view showing a second swing support point 32 which is viewed from an object side (one side "+Z" in the "Z"-axis direction).

In the embodiment described above, the fixing members 36h and 37h are adhesives 36i and 37i. However, as shown in FIG. 9A, a plate-shaped member 36j may be used as the fixing member 36h which is fixed to the fixed plate part 361 and the movable plate part 363 by welding, adhesion or the like on an open end side of the first contact spring 36. Further, as shown in FIG. 9B, a plate-shaped member 37j may be used as the fixing member 37h which is fixed to the fixed plate part 371 and the movable plate part 373 by welding, adhesion or the like on an open end side of the second contact spring 37.

In this embodiment, the plate-shaped member 36j (fixing member 36h) may be structured of a bent portion which is bent from the fixed plate part 361 of the first contact spring 36, and the plate-shaped member 37j (fixing member 37h) may be structured of a bent portion which is bent from the fixed plate part 371 of the second contact spring 37. In this case, no additional members are required for providing the plate-shaped member 36j (fixing member 36h) and the plate-shaped member 37j (fixing member 37h).

Other Embodiments

In the embodiment described above, the first contact spring 36 provided with the fixing member 36h is used in both of the two first swing support points 31 and the second contact spring 37 provided with the fixing member 37h is used in both of the two second swing support points 32. However, it may be structured that the first contact spring 36 provided with the fixing member 36h is used in only one of the two first swing support points 31 and the second contact spring 37 provided with the fixing member 37h is used in only one of the two second swing support points 32. Further, in the first swing support points 31 and the second swing support points 32, it may be structured that only the first swing support point 31 is provided with the first contact spring 36 having the fixing member 36h, or it may be structured that only the second swing support point 32 is provided with the second contact spring 37 having the fixing member 37h. In the embodiment described above, the penetration part for providing the fixing member is provided in the movable body 10 (holder 40). However, the penetration part for providing the fixing member may be provided in the fixed body 20.

Other Structural Example of Optical Unit 100

In the embodiment described above, at least an embodiment of the present invention is applied to the optical unit 100 for photographing as an example. However, at least an embodiment of the present invention may be applied to shake correction of an optical device from which a light beam is emitted such as a laser pointer, a portable or on-vehicle projection display device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
   a movable body comprising an optical element;
   a fixed body which swingably supports the movable body around a first axial line intersecting an optical axis direction and swingably supports the movable body around a second axial line intersecting the optical axis direction and the first axial line through a gimbal mechanism; and a drive mechanism, which is a magnetic drive mechanism comprising a coil and a magnet provided so as to face each other between the movable body and the fixed body, structured to magnetically drive the movable body around the first axial line and the second axial line;

wherein the gimbal mechanism comprises:
a movable frame;
two first swing support points which are provided between the movable frame and the fixed body at two positions separated from each other in a direction of the first axial line; and
two second swing support points which are provided between the movable frame and the movable body at two positions separated from each other in a direction of the second axial line;

wherein at least one swing support point of the two first swing support points and the two second swing support points comprises:
a contact spring in a plate spring shape comprising a movable plate part with which the movable frame is abutted, and a fixed plate part which is bent back from an end part of the movable plate part to an opposite side to the movable frame; and
a fixing member which fixes the movable plate part to the fixed plate part;
wherein the fixing member is either an adhesive applied between the fixed plate part and the movable plate part or a plate-shaped member which is connected with the fixed plate part and the movable plate part on an open end side of the contact spring.

2. The optical unit with a shake correction function according to claim 1, wherein the movable plate part is fixed to the fixed plate part by the fixing member in a state that the movable plate part has been elastically deformed toward the fixed plate part.

3. The optical unit with a shake correction function according to claim 2, wherein the movable frame is elastically deformable in a direction perpendicular to the optical axis direction.

4. The optical unit with a shake correction function according to claim 2, further comprising:
a first contact spring as the contact spring whose fixed plate part is held by the fixed body in each of the two first swing support points; and
a second contact spring as the contact spring whose fixed plate part is held by the movable body in each of the two second swing support points;
wherein the fixing member is provided in each of the two first contact springs and each of the two second contact springs.

5. The optical unit with a shake correction function according to claim 4, wherein
the first contact spring and the fixed body are overlapped with the movable frame on both sides in the optical axis direction to structure a first stopper for restricting a movable range in the optical axis direction of an abutting portion of the movable frame with the first contact spring, and
the second contact spring and the movable body are overlapped with the movable frame on both sides in the optical axis direction to structure a second stopper for restricting a movable range in the optical axis direction of an abutting portion of the movable frame with the second contact spring.

6. The optical unit with a shake correction function according to claim 4, further comprising at least one of:
penetration parts of the movable body which are overlapped with the two first swing support points in the optical axis direction; and
penetration parts of the fixed body which are overlapped with the two second swing support points in the optical axis direction.

7. The optical unit with a shake correction function according to claim 1, wherein the movable plate part is fixed to the fixed plate part by the adhesive in a state that the movable plate part has been elastically deformed toward the fixed plate part.

8. The optical unit with a shake correction function according to claim 7, further comprising:
a first contact spring as the contact spring whose fixed plate part is held by the fixed body in each of the two first swing support points; and
a second contact spring as the contact spring whose fixed plate part is held by the movable body in each of the two second swing support points;
wherein the adhesive is applied between the fixed plate part and the movable plate part in each of the two first contact springs and the two second contact springs.

9. The optical unit with a shake correction function according to claim 8, wherein
the first contact spring and the fixed body are overlapped with the movable frame on both sides in the optical axis direction to structure a first stopper for restricting a movable range in the optical axis direction of an abutting portion of the movable frame with the first contact spring, and
the second contact spring and the movable body are overlapped with the movable frame on both sides in the optical axis direction to structure a second stopper for restricting a movable range in the optical axis direction of an abutting portion of the movable frame with the second contact spring.

10. The optical unit with a shake correction function according to claim 1, wherein the movable plate part is fixed to the fixed plate part by the plate-shaped member in a state that the movable plate part has been elastically deformed toward the fixed plate part.

11. The optical unit with a shake correction function according to claim 10, further comprising:
a first contact spring as the contact spring whose fixed plate part is held by the fixed body in each of the two first swing support points; and
a second contact spring as the contact spring whose fixed plate part is held by the movable body in each of the two second swing support points;
wherein the plate-shaped member is connected with the fixed plate part and the movable plate part in each of the two first contact springs and the two second contact springs.

12. The optical unit with a shake correction function according to claim 1, wherein
an abutting portion of the movable frame with the contact spring is formed of a spherical body, and
a portion of the contact spring where the spherical body is abutted is formed in a concave curved-surface shape.

13. The optical unit with a shake correction function according to claim 12, wherein the movable plate part is fixed to the fixed plate part by the fixing member in a state that the movable plate part has been elastically deformed toward the fixed plate part.

14. The optical unit with a shake correction function according to claim 13, further comprising:
   a first contact spring as the contact spring whose fixed plate part is held by the fixed body in each of the two first swing support points; and
   a second contact spring as the contact spring whose fixed plate part is held by the movable body in each of the two second swing support points;
   wherein the fixing member is provided in each of the two first contact springs and the two second contact springs.

15. The optical unit with a shake correction function according to claim 14, wherein the movable plate part is fixed to the fixed plate part by the adhesive in a state that the movable plate part has been elastically deformed toward the fixed plate part.

16. The optical unit with a shake correction function according to claim 1, wherein
   the movable frame and the contact spring are made of nonmagnetic material.

17. The optical unit with a shake correction function according to claim 1, wherein
   the fixed body comprises a cover to one side in the optical axis direction of the movable body, and
   the two first swing support points are structured between the cover and the movable frame.

18. The optical unit with a shake correction function according to claim 1, wherein
   the movable frame is provided with four corner parts,
   the two first swing support points are structured in two corner parts located at diagonal positions of the four corner parts, and
   the two second swing support points are structured in the other two corner parts.

19. The optical unit with a shake correction function according to claim 18, further comprising:
   a first contact spring as the contact spring whose fixed plate part is held by the fixed body in each of the two first swing support points provided in the two corner parts; and
   a second contact spring as the contact spring whose fixed plate part is held by the movable body in each of the two second swing support points provided in the other two corner parts;
   wherein the fixing member is provided in each of the two first contact springs and the two second contact springs.

20. A manufacturing method for an optical unit with a shake correction function, the optical unit comprising a movable body comprising an optical element; a fixed body which swingably supports the movable body around a first axial line intersecting an optical axis direction and swingably supports the movable body around a second axial line intersecting the optical axis direction and the first axial line through a gimbal mechanism; and a drive mechanism, which is a magnetic drive mechanism comprising a coil and a magnet provided so as to face each other between the movable body and the fixed body, structured to magnetically drive the movable body around the first axial line and the second axial line; wherein the gimbal mechanism comprises: a movable frame; two first swing support points which are provided between the movable frame and the fixed body at two positions separated from each other in a direction of the first axial line; and two second swing support points which are provided between the movable frame and the movable body at two positions separated from each other in a direction of the second axial line;
   the manufacturing method comprising:
   previously providing a contact spring in a plate spring shape in at least one swing support point of the two first swing support points and the two second swing support points, the contact spring comprising:
      a movable plate part with which the movable frame is abutted; and
      a fixed plate part which is bent back from an end part of the movable plate part to an opposite side to the movable frame, and
   when the gimbal mechanism is to be structured, after the movable frame is supported by the contact spring, the movable plate part and the fixed plate part are fixed to each other by a fixing member;
   wherein the fixing member is either an adhesive applied between the fixed plate part and the movable plate part or a plate-shaped member which is connected with the fixed plate part and the movable plate part on an open end side of the contact spring.

21. The manufacturing method for an optical unit with a shake correction function according to claim 20, wherein
   when the movable frame is to be supported by the movable plate part, the movable plate part is fixed to the fixed plate part by the adhesive in a state that the movable plate part has been elastically deformed toward the fixed plate part.

22. The manufacturing method for an optical unit with a shake correction function according to claim 21, wherein
   a first contact spring as the contact spring whose fixed plate part is held by the fixed body is provided in each of the two first swing support points,
   a second contact spring as the contact spring whose fixed plate part is held by the movable body is provided in each of the two second swing support points, and
   the adhesive is applied between the fixed plate part and the movable plate part in each of the two first contact springs and the two second contact springs.

* * * * *